United States Patent [19]
Rinaldo

[11] 3,750,888
[45] Aug. 7, 1973

[54] FILTER ASSEMBLY
[75] Inventor: James D. Rinaldo, Joliet, Ill.
[73] Assignee: Caterpillar Tractor Co., Peoria, Ill.
[22] Filed: Sept. 13, 1971
[21] Appl. No.: 179,658

[52] U.S. Cl................................ 210/172, 210/451
[51] Int. Cl....................... E03b 11/00, B01d 27/08
[58] Field of Search.................... 210/451, 437, 456, 210/137, 132, 247, 307, 441, 445, 429, 172, 167, DIG. 14

[56] References Cited
UNITED STATES PATENTS
| | | | |
|---|---|---|---|
| 3,256,989 | 6/1966 | Hultgren | 210/DIG. 17 |
| 3,353,680 | 11/1967 | Niebergall | 210/DIG. 17 |
| 3,272,336 | 9/1966 | Humbert, Jr. | 210/DIG. 17 |
| 960,418 | 6/1910 | Selg | 210/247 |
| 1,609,856 | 12/1926 | Blackman | 210/451 |
| 3,572,508 | 3/1971 | Rice | 210/172 X |

Primary Examiner—Samih N. Zaharna
Assistant Examiner—T. A. Granger
Attorney—Fryer et al.

[57] ABSTRACT

A filter assembly for filtering fluid returning to a reservoir including a filter housing, a base closing one end of the housing, an outlet port in the base, and a perforated fluid-diffusing member enclosing said base together with the housing in an axially stacked arrangement therewith to disperse the discharge of fluid from the outlet port in a relatively wide flow pattern in order to minimize surface turbulence and resultant aeration of the fluid within the reservoir.

9 Claims, 2 Drawing Figures

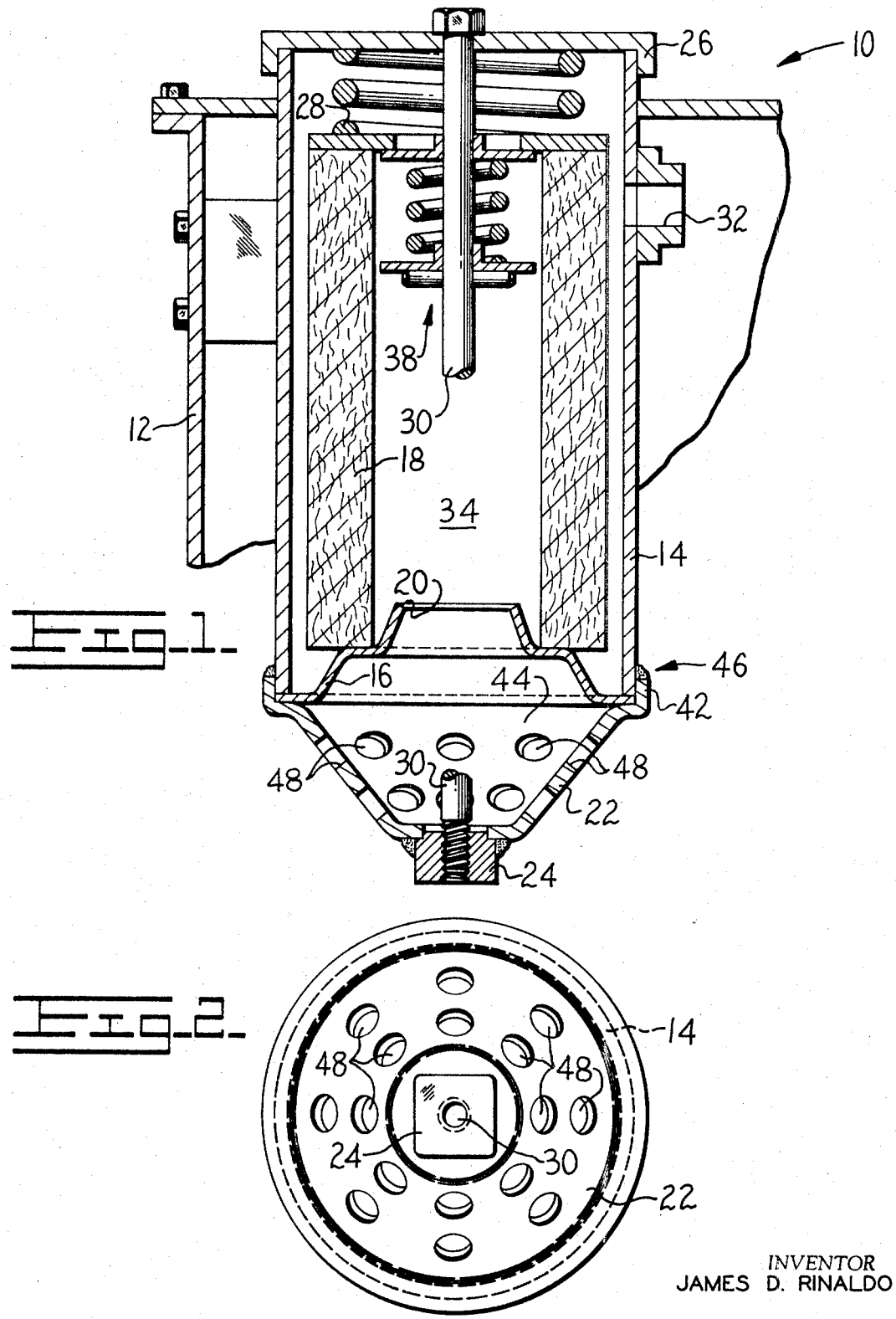

FILTER ASSEMBLY

BACKGROUND OF THE INVENTION

Hydraulic circuits normally include a filter assembly in the fluid return line to remove contaminants from the fluid as it is being circulated by the pump. A diffusing device is usually attached to the bottom or discharge end of the filter assembly to diffuse the flow of fluid therefrom to minimize surface turbulence of the fluid in the reservoir and thereby reduce the resultant aeration of the fluid. Such aeration can cause valve chatter and instability in the hydraulic circuit. Often times, the filter assembly and diffusing device are mounted inside the reservoir of a hydraulic control system on a vehicle to reduce external piping, to protect the components from physical damage, and to conserve space on the vehicle.

Conventionally, the diffusing device comprises a perforated tube-like member of uniform cross-section that is secured to the bottom of the filter assembly by a flange and bolt arrangement, and it has its axis positioned perpendicular to the longitudinal axis of the filter assembly.

The bottom of the filter assembly and the diffusing device are usually made from metal castings which are complex and costly to manufacture.

SUMMARY OF THE INVENTION

The present invention provides a compact, non-complex, inexpensive and efficient filter assembly which includes a perforated fluid diffusing means for substantially minimizing fluid turbulence and resultant aeration.

The filter assembly further comprises a housing having one end through which fluid is discharged from the housing, a base member disposed in the end of the housing, an outlet port formed in the base and diffusing means enclosing the end of the housing. The diffusing means comprises a perforated frustoconical member, axially aligned with the housing and base, and enclosing the outlet port in the base to disperse fluid discharged from the outlet port in a relatively wide flow pattern.

BRIEF DESCRIPTION OF THE DRAWING

FIG. 1 is a sectional view of an improved filter assembly shown mounted in a hydraulic reservoir.

FIG. 2 is a bottom view of the improved filter assembly.

DESCRIPTION OF THE PREFERRED EMBODIMENT

Referring to the drawing, a filter assembly 10 is shown in FIG. 1 as being mounted in a hydraulic reservoir or tank 12. The filter assembly includes a cylindrical housing 14, a conically shaped base 16, a cartridge-type filter element 18 seated on the base, an outlet port 20 formed through the base and positioned interiorly of the filter element and a diffusing means or member 22. The assembly is held together by means of a nut 24 welded to the diffusing member, a cover 26, a coil spring 28 disposed between the cover and the filter element and a tie-bolt 30 which threadably engages the nut.

The housing is provided with an inlet port 32 which directs fluid, being returned from a remote control system, into the filter assembly. The fluid passes through the filter element, into interior chamber 34 thereof and out through outlet port 20 and the diffusing member to the tank.

A bypass valve 38 is reciprocally mounted on the tie-bolt at one end of the filter element. Should the element become clogged, the resulting low pressure differential across the valve will allow the valve to open against a spring 40 to allow the return fluid to bypass the element until the element is replaced.

The diffusing member has an annular flange 42 enclosing the base and the discharge end of the housing, and defines a frustoconical chamber 44 into which fluid is discharged from the outlet port. Alternately, the annular flange 42 may enclose the base 16 but be positioned longitudinally inside the discharge end of the housing 14.

The housing and diffusing member are secured together such as by welding, as shown at 46, or any other suitable means such as a bolt and flange arrangement. In this manner, the housing, base, and diffusing member form an axially aligned unit which requires a minimum of space in the hydraulic reservoir 12. Both the base and the diffusing member are stamped from a flat sheet of material which affords an inexpensive method of manufacturing these parts.

The diffusing member is provided with a plurality of apertures 48 to allow fluid to escape from chamber 44. The apertures in the diffusing member will spread out the flow of returning fluid so as to decrease the velocity of the returning fluid. This will minimize the amount of surface turbulence of the fluid and as a result will minimize aeration of the fluid in the reservoir.

I claim:

1. A cartridge-type filter assembly comprising a longitudinal tubular housing, having a top end and a discharge end, a fluid inlet into said tubular housing near the top end thereof,
   the discharge end of said housing extending into a reservoir;
   a base within said tubular housing disposed at the discharge end of said housing;
   a fluid outlet port formed in said base, a filter element within said housing disposed between said fluid inlet and said fluid outlet, and a perforated frustoconical shaped fluid-diffusing means having a plurality of apertures formed therein and enclosing said base in cooperation with said housing to communicate and disperse fluid discharged from the outlet port in said base in a relatively wide flow pattern directly into said reservoir.

2. The filter assembly of claim 1 wherein said perforated diffusing means, said base and said filter housing form an axially aligned unit.

3. The filter assembly of claim 1 wherein the base is a generally frustoconical member having an upper smaller end and a larger lower end, and has an annular flange at the larger end thereof which abuts the discharge end of the housing.

4. The invention defined in claim 3 wherein said frustoconical member has an annular flat formed in the side thereof to provide a seat for an annular filter cartridge, and wherein said outlet port is formed in the smaller end thereof.

5. The filter assembly of claim 1 wherein said perforated diffusing member includes an annular flange which abuts the base and extends circumferentially of the housing at the discharge end thereof.

6. The filter assembly of claim 5 wherein said flange is welded to said housing.

7. The filter assembly of claim 5 further comprising a tie-bolt extending therethrough along the axis thereof, and a nut abutting said diffusing member and threadably engaging said tie-bolt.

8. The invention defined in claim 7 wherein said nut is secured to said diffusing member.

9 The invention of claim 4 further comprising a tubular filter cartridge seated on the annular flat.

* * * * *